Figure 1:
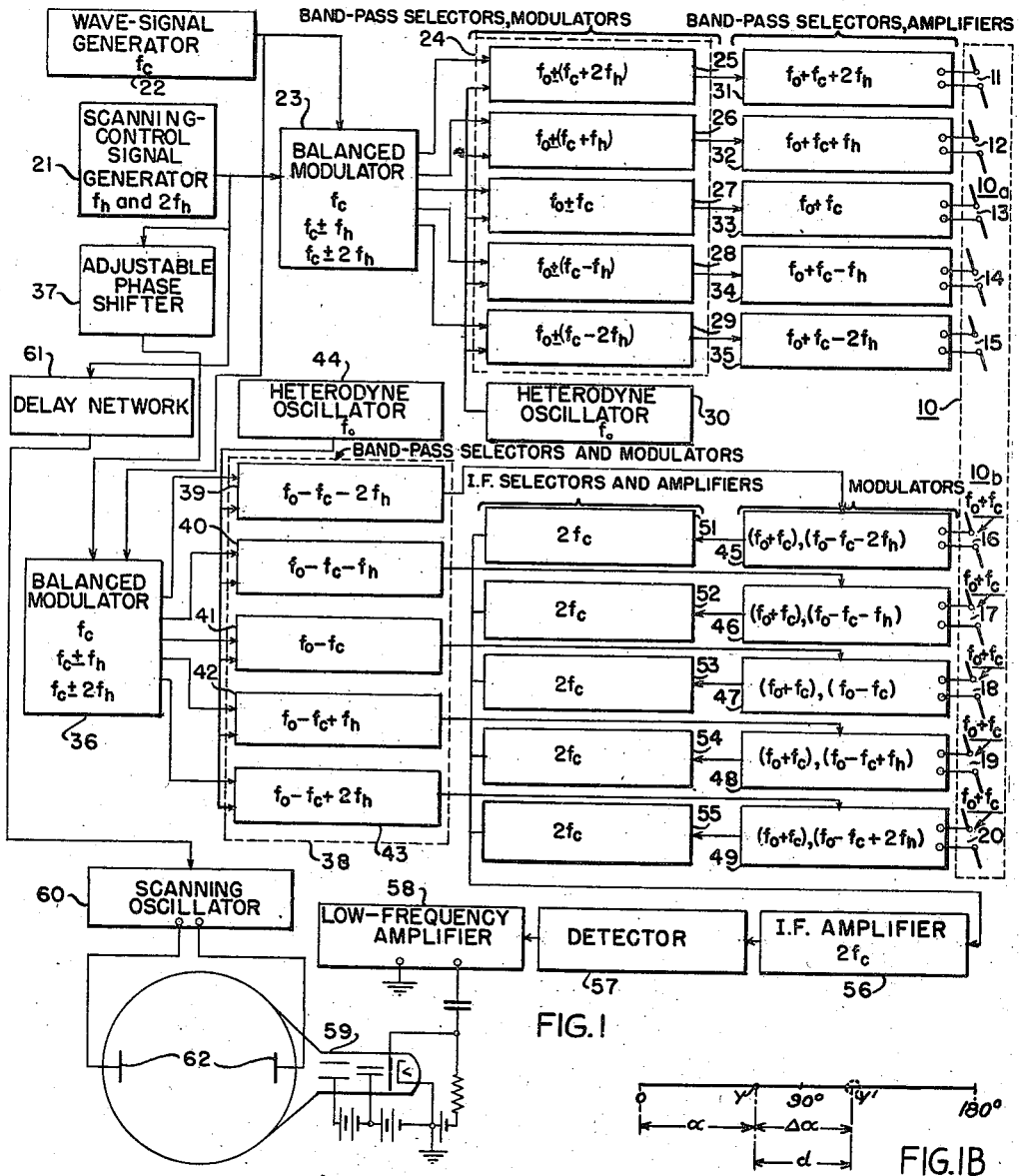

Aug. 26, 1947.  H. M. LEWIS  2,426,460
SYSTEM FOR LOCATING A RADIATED-SIGNAL REFLECTOR
Filed Oct. 27, 1943    3 Sheets-Sheet 3

INVENTOR
HAROLD M. LEWIS
ATTORNEY

Patented Aug. 26, 1947

2,426,460

UNITED STATES PATENT OFFICE 2,426,460

SYSTEM FOR LOCATING A RADIATED-SIGNAL REFLECTOR

Harold M. Lewis, Allenhurst, N. J., assignor, by mesne assignments, to Hazeltine Research, Inc., Chicago, Ill., a corporation of Illinois Application October 27, 1943, Serial No. 507,861

13 Claims. (Cl. 250—11)

1

The present invention relates to systems for locating a radiated-signal reflector. More particularly, the invention relates to such systems of the type in which a predetermined space is scanned with a sharply concentrated radiated-signal beam and radiated-signal energy of the beam reflected by the reflector, which may for example be an aircraft, is utilized to provide an indication of the direction and distance of the reflector from the system.

It has been proposed in aircraft locating systems that a predetermined space be scanned in either one or two directions with a sharply concentrated radiated beam of wave signals and that the wave-signal energy which is reflected from the aircraft be received and utilized to provide an indication of the direction and distance of the aircraft from the locating station. This has been accomplished in several prior art arrangements by the provision of a radiated-signal translator system having a radiation characteristic in the form of a sharply concentrated beam, this translator system being physically rotated by suitable mechanical apparatus to effect the scanning action. The general disadvantage and limitations of mechanical scanning arrangements of this nature are well understood by those skilled in the art. Among these may be mentioned the disadvantages that appreciable power is required physically to move the radiated-signal translating system for purposes of scanning and the fact that the rate of scanning is at best rather low which unduly restricts and limits the usefulness of the system.

A wave-signal scanning system substantially entirely electrical in nature forms the subject matter of copending applications of Arthur V. Loughren, Serial Nos. 395,172 and 418,712, filed May 26, 1941, and November 12, 1941, now Patents 2,407,169 and 2,409,944, issued September 3, 1946, and October 22, 1946, respectively. That system provides that the sharply directive response characteristic of the system be caused to scan a predetermined space by the use of an array of physically spaced radiated-signal translators which are coupled through individual wave-signal delay means or shifters to a common wave-signal translating channel. The present invention constitutes an improvement on the electrical scanning system of the aforesaid Loughren applications.

It is an object of the present invention, therefore, to provide a new and improved system for locating a radiated-signal reflector which avoids

2 one or more of the disadvantages and limitations of the prior art systems of this nature.

It is a further object of the invention to provide a system for locating a radiated-signal reflector in which scanning of a predetermined space is effected entirely by electrical means which does not require any moving mechanical parts and one which involves a fundamental simplification and improvement of electrical phasing means employed therein to accomplish the desired scanning action.

It is an additional object of the invention to provide a system for locating a radiated-signal reflector in which a predetermined space is scanned with a radiated-signal beam and either or both the rate of scanning and the configuration of the scanning beam may be readily and easily controlled by one or more simple adjustments of wave-signal apparatus included in the system.

It is a further object of the invention to provide a new and improved system for locating a radiated-signal reflector and one which is exceptionally well adapted to the type of operation wherein pulse modulation of wave-signal energy translated by the system is utilized to effect high power output relative to the average power capabilities of the apparatus utilized.

It is an additional object of the invention to provide a new and improved system for locating a radiated-signal reflector in which the receiver component thereof has a sharply directive response characteristic which angularly scans a predetermined space in synchronism with the radiated-signal beam of the system but displaced at any selected angle with relation thereto.

In accordance with the invention, a system for locating a radiated-signal reflector comprises a radiated-signal translating system including a plurality of spaced signal translators and wave-signal supply means for applying wave signals to at least one of the translators and wave signals of a different frequency to another of the translators to provide a radiated-signal translating system which angularly scans a predetermined space with a radiated-signal beam. The beam scans across any radiated-signal reflector in the aforesaid space and radiated-signal energy of the beam is reflected therefrom. The system also includes modulator means for modulating the reflected radiated-signal energy received by one of the translators with a modulation signal having a predetermined frequency difference from the wave signal applied to the first-mentioned one translator and for modulating the reflected radiated-signal energy received by another of the translators with a modulation signal having, with respect to the wave signal applied to the aforesaid first-mentioned other translator, a predetermined frequency difference such that predetermined ones of the resulting modulation components have additive phase only for one direction of reception by the last-mentioned translators, which direction scans the aforesaid predetermined space in synchronism with the radiated-signal beam. The system additionally includes means for combining and utilizing the aforesaid predetermined modulation components to indicate the direction of the reflector from the system.

For a better understanding of the present invention, together with other and further objects thereof, reference is had to the following description taken in connection with the accompanying drawings, and its scope will be pointed out in the appended claims.

Figure 2:
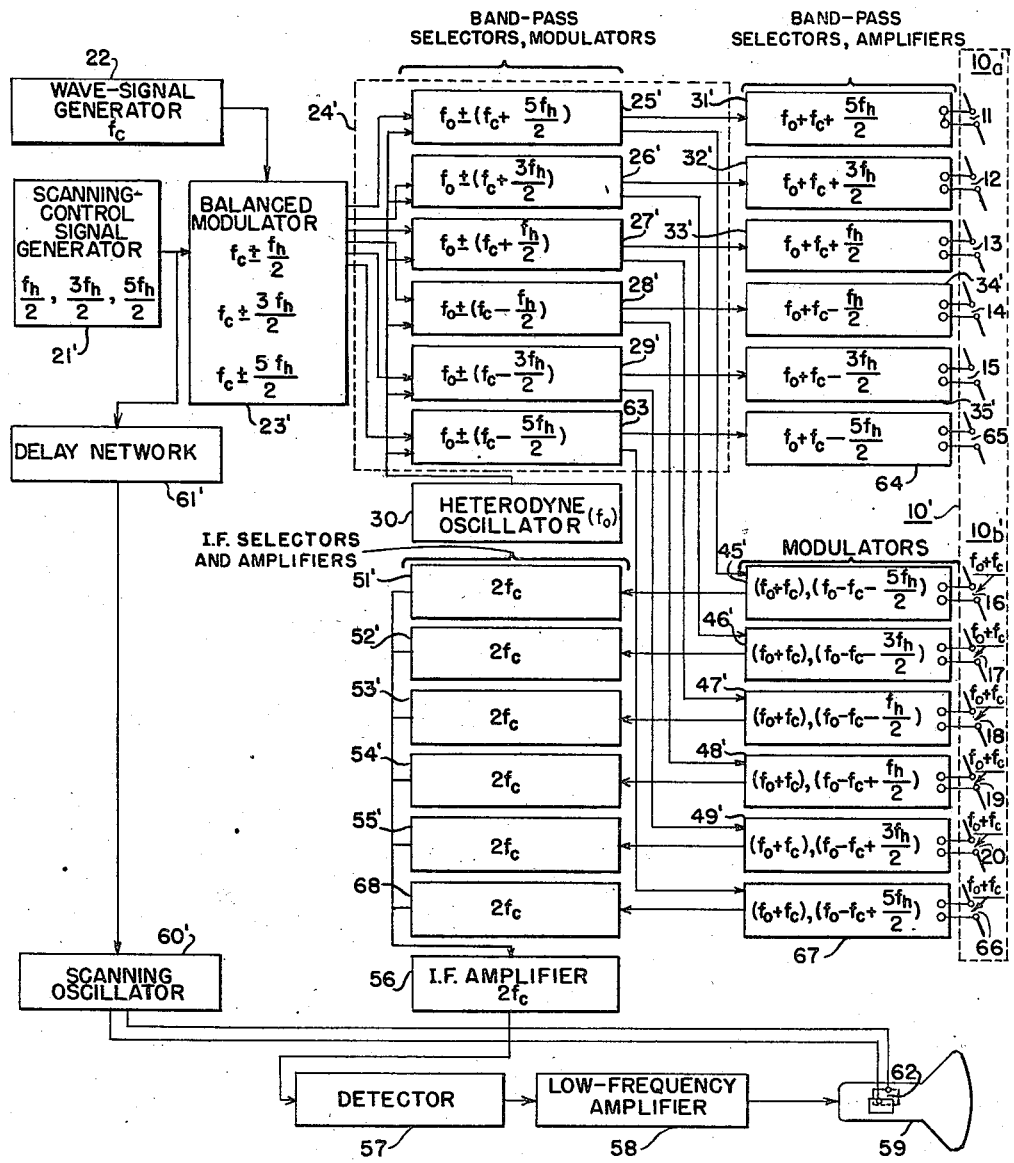
Figure 3:
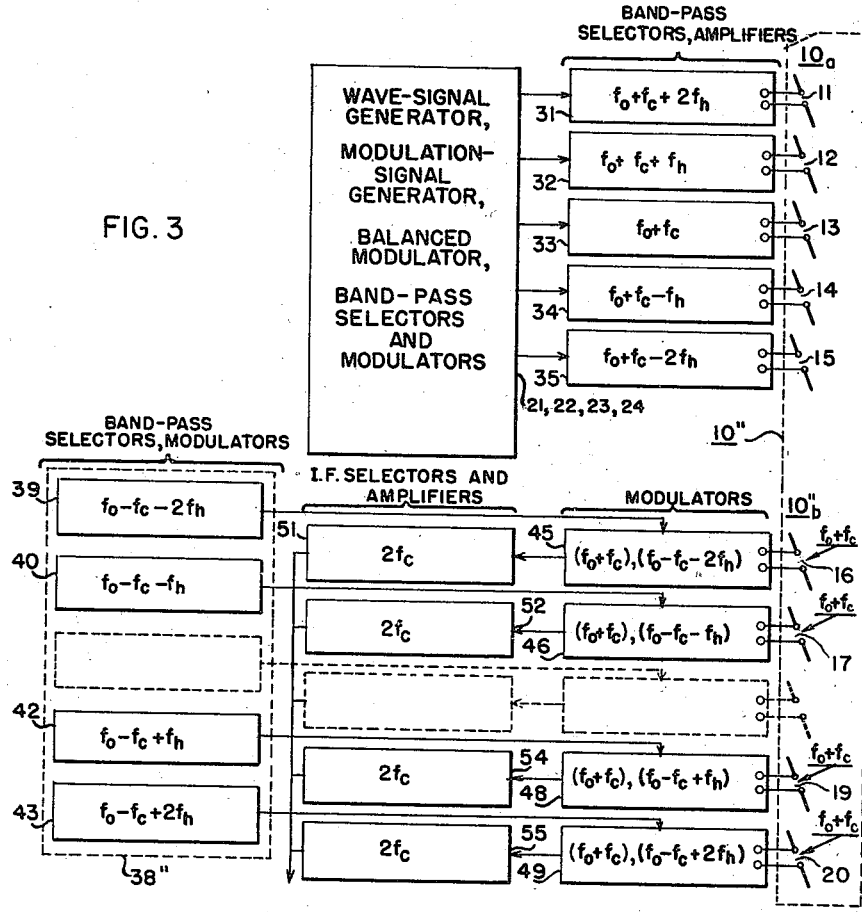
Figure 4:
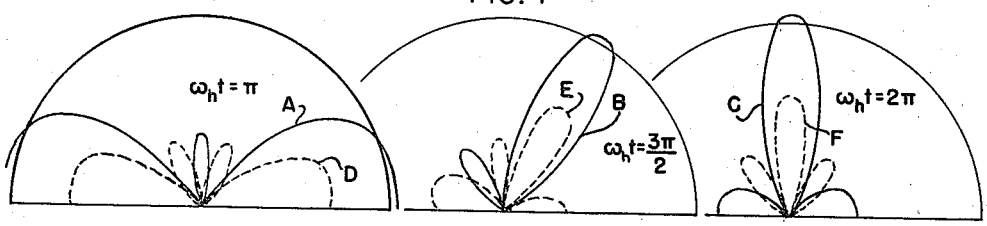

Referring now to the drawings, Fig. 1 represents, schematically, a complete system for locating a radiated-signal reflector embodying the present invention; Fig. 1A represents directive scanning patterns of the Fig. 1 system at two selected moments in a scanning cycle and is used as an aid in explaining the operation of the invention; Fig. 1B is an illustrative indication used in explanation with Fig. 1A; Fig. 1C represents selected portions of the radiated-signal translating system, per se, of the Fig. 1 arrangement and is used as an aid in explaining the operation of the locating system; Fig. 2 represents, schematically, a complete system which embodies the present invention in a modified form; Fig. 3 represents, schematically, a portion of a locating system which embodies the present invention in another modified form; and Fig. 4 illustrates the directive characteristic of this arrangement at three selected instants during a scanning cycle.

Referring now more particularly to Fig. 1 of the drawings, there is represented, schematically, a complete system for locating a radiated-signal reflector which embodies the present invention in a particular form. This system includes a radiated-signal translating system 10 having a plurality of spaced signal translators 11–20, inclusive. These translators may, for example, be vertical dipole antennas horizontally aligned and preferably are grouped into two spaced translator arrays 10a and 10b with the translators in each array linearly aligned. The translators of each of the arrays 10a and 10b preferably are equally spaced by values dependent upon the desired configuration of the major directivity lobe which is characteristic of such arrays. The manner in which the spacing of the translators affects the major directivity lobe is considered in detail in the copending application of Harold M. Lewis, Serial No. 507,859, filed concurrently herewith, entitled "System for space scanning with a radiated wave-signal beam," and assigned to the same assignee as the present application. For most applications, it is preferable to space the translators in each array by one-half wave length of the mean or nominal frequency of the wave signals applied to the translators of the array 10a.

The locating system of the present invention also includes wave-signal supply means for applying wave signals to at least one of the translators of the translating system 10 and wave signals of a different frequency to another of the translators of the system to provide a radiated-signal translating system which angularly scans a predetermined space with a radiated-signal beam. This means comprises a source or generator 21 of scanning-control signals having frequency components related to the number and physical spacing of the translators; the frequency components in particular have frequency values proportional to the spacings of the translators from at least one common reference point. In a locating system having five equally-spaced translators in each array, for example, the scanning-control signal generator 21 provides a scanning-control signal having two frequency components $f_h$ and $2f_h$ which thus have values of frequency proportional to the physical spacings of the translators from the centrally positioned translator, considered as a reference point. It will be understood, of course, that the stated values of the frequency components and equal spacings of the translators are chosen for purposes of example only and that the use of additional translators or unequal spacings thereof requires that the scanning-control signal have additional frequency components or frequency components with values other than those recited.

The wave-signal deriving means additionally comprises means responsive to the scanning-control signals of the generator 21 for deriving a plurality of wave signals of individual different frequencies. This means comprises a wave-signal generator 22, for generating a subcarrier wave signal having a frequency $f_c$, and a balanced modulator 23 having an input circuit coupled to the output circuits of both of the generators 21 and 22. The output circuit of the modulator 23 is coupled to a unit 24 comprising a plurality of band-pass selectors and modulators 25–29, inclusive, having the selectors thereof preceding the modulators and individually tuned to select individual frequency components of the modulated wave signal developed in the output circuit of the modulator 23. The frequency $f_c$ of the subcarrier wave signal of generator 22 preferably is sufficiently low that these modulation-frequency components may be easily separated by the selective action of the selectors of unit 24. Hence, there is included means for heterodyning these selected modulation-frequency components to a higher frequency, suitable for radiation, comprising a heterodyne oscillator 30 which generates a heterodyne wave signal of frequency $f_o$ and which has an output circuit coupled to an input circuit of each of the modulators of unit 24. A plurality of band-pass selector and amplifier units 31–35, inclusive, have input circuits coupled to the output circuits of the respective selector-modulator units 25–29, inclusive, of unit 24 and have output circuits coupled to the respective translators 11–15, inclusive, of the array 10a. The selectors of the units 31–35, inclusive, precede the amplifiers thereof and are tuned to select, in this instance, the sum-frequency heterodyne components developed in the output circuits of the modulators of unit 24. The amplifiers of the latter units preferably have relative gains such that the wave signals applied to the translators 11–15, inclusive, have equal amplitudes.

As previously mentioned, the radiated-signal beam of the array 10a angularly scans a predetermined space. In doing so, the beam scans across any radiated-signal reflector in this space and radiated-signal energy of the beam is reflected from any such reflector.

The locating system includes modulator means for modulating the reflected radiated-signal energy received by one of the translators of the receiving array 10b with a modulation signal having a predetermined frequency difference from the wave signal applied to a translator of the array 10a and for modulating the reflected radiated-signal energy received by another of the translators of the array 10b with a modulation signal having with respect to the wave signal applied to another translator of the array 10a a frequency difference not less than the last-mentioned predetermined frequency difference. Predetermined ones of the resulting modulation components have additive phase for one direction of reception by the last-mentioned translators, which direction scans the aforementioned predetermined space in synchronism with the radiated-signal beam. The receiver translators last mentioned are shown by way of illustration as comprising the translator array 10b.

The modulator means last mentioned comprises means responsive to the scanning-control signals of the generator 21 for providing the required modulation signals. More particularly, the modulator means comprises a balanced modulator 36 having an input circuit coupled through an adjustable phase shifter 37 to the output circuit of the generator 21 and having an input circuit also coupled to the output circuit of the wave-signal generator 22. The output circuit of the modulator 36 is coupled to the input circuit of a unit 38 which includes a plurality of band-pass selector and modulator units 39–43, inclusive, the selectors of which precede the modulators thereof and are tuned to individual ones of the frequency components of the modulated wave signal developed in the output circuit of the modulator 36. These frequency components, as in the case of those developed by the modulator 23 previously discussed, are of relatively low frequency to facilitate their selection by the selectors of units 39–43, inclusive. A heterodyne oscillator 44 is coupled to the input circuits of the modulators of units 39–43, inclusive, for the purpose of increasing the frequencies of these frequency components to values suitable to provide the required modulation signals.

The output circuits of the selector-modulator units 39–43, inclusive, include selectors which select the difference-frequency heterodyne components developed in these units and which are respectively coupled to an input circuit of a plurality of modulators 45–49, inclusive. An input circuit of the latter modulators is also coupled to the respective translators 16–20, inclusive, of the translator array 10b. The output circuits of the modulators 45–49, inclusive, are respectively coupled to the input circuits of a plurality of intermediate-frequency selectors and amplifiers 51–55, inclusive, which have output circuits coupled in common to the input circuit of an intermediate-frequency amplifier 56. Following the latter amplifier, in the order named, are a detector 57 and a low-frequency amplifier 58, the output circuit of which is coupled to the input electrodes of a cathode-ray tube 59 to control the cathode-ray beam thereof.

The locating system includes means responsive to the scanning-control signal of the generator 21 for deflecting the cathode-ray beam of the tube 59 in synchronism with the scanning beam of the translator array 10a. This means comprises a scanning oscillator 60 having a synchronizing circuit coupled through a delay network 61 to the output circuit of the generator 21 and having an output circuit coupled to a pair of deflecting electrodes 62 provided in the cathode-ray tube 59.

Considering now the operation of the locating system just described, the wave signal generated by the generator 22 is modulated in the balanced modulator 23 with the scanning-control signal of the generator 21 to provide a modulated wave signal having the frequency components designated in association with the modulator 23 in Fig. 1. Individual ones of these frequency components are selected by the selectors of the selector-modulator units 25–29, inclusive, and are raised to higher frequencies in the latter units by heterodyne oscillations supplied by the oscillator 30. It is the purpose of unit 24 to increase the frequencies of the modulation-frequency components to values suitable for radiation; hence, it is preferable to select the sum-frequency heterodyne components developed in the output circuits of the units 25–29, inclusive, and this is done by the selectors of the selector-amplifier units 31–35, inclusive. These selected components have frequencies indicated in Fig. 1 in association with the latter units and are applied to the translators of the array 10a for radiation therefrom.

It will be seen from inspection of Fig. 1 that the wave signals applied to the translators of the array 10a have individual difference frequencies which increase in order in the frequency spectrum in the order of positioning of the translators in the array 10a starting with the end translator 15. When the translator array 10a is excited by wave signals in this manner, its directional radiation characteristic is in the nature of a sharply concentrated radiated-signal beam having maximum value in a direction which angularly scans, with at least one major radiation lobe or beam, through an angle of 180 degrees. The reason for this is explained in detail in the copending Lewis application, Serial No. 507,859, previously mentioned. Very briefly, the wave signals applied to the translators of the array 10a may be considered as equivalent to waves having the same instantaneous frequency but relative values of phase angles which vary linearly with time and are proportional to the physical spacings of the translators in the array. These relative phase variations cause the directive radiation characteristic of the array to scan sinusoidally with time. As a result, then, the array of translators 10a angularly scans a predetermined space with a radiated-signal beam.

Due to the physical spacings of the translators of the array 10a and the effective phase displacements of the wave signals applied to the translators thereof, the radiation field intensity at any radiated-signal reflector may be considered as having substantially zero value except during the small interval of time when the radiated-signal beam is sweeping across the reflector. Consequently, the reflected radiated-signal energy has the frequency of the wave signal applied to the translator 13, with sideband amplitude-modulation components, with the result that the reflected radiated-signal energy also is effectively a carrier wave amplitude-modulated with pulse components. The reflected radiated-signal energy is received by the translators of the array 10b and applied to the input circuit of the modulators 45–49, inclusive. Since the translators of the array 10b also are physically spaced, the radiated-signal energy received by any one of the translators in general is not in phase with that received by another. To derive components of the radiated-signal energy received by the array 10b which are in phase, the balanced modulator 36 derives a modulated wave signal in the manner of the modulator 23 previously discussed and the modulation components of this wave signal are individually selected by the selectors of units 39–43, inclusive, heterodyned to a higher frequency by the action of the heterodyne oscillator 44 and the modulators of units 39–43, inclusive, and are applied as modulation signals individually to the modulators 45–49, inclusive. As explained in the copending Lewis application, Serial No. 507,860, filed concurrently herewith, entitled "Radiated-signal receiving system," and assigned to the same assignee as the present application, the use of modulation signals having related frequencies of this nature has the effect that predetermined ones of the resulting modulation components developed in the output circuits of the modulators 45–49, inclusive, have additive phase only for one direction of reception by the translators of the array 10b, but this direction angularly and periodically scans a predetermined space. The application to the modulators 45–49, inclusive, of modulation signals having values of frequency, designated in Fig. 1, which are related to the frequencies of the wave signals applied to the translators of the array 10a, ensures that the directive-response characteristic of the array 10b scans in synchronism with the radiated-signal beam of the array 10a. This required frequency relationship, which is considered hereinafter in greater detail, is established and maintained in the present locating system by deriving the modulation signals and applied wave signals in common from the frequency components of the scanning-control signal generated by the generator 21.

Hence, any radiated-signal energy reflected by a reflector in the scanned space is received by the array 10b and components of the reflected radiated-signal energy are caused to be in phase in the output circuits of the modulators 45–49, inclusive, by selective utilization of the modulation components, as explained. This in-phase energy is selected and amplified by the units 51–55, inclusive, combined in the common input circuit of the amplifier 56, detected by the detector 57, and the detection components after amplification by the low-frequency amplifier 58 are applied to the input electrodes of the cathode-ray tube 59.

The cathode-ray beam of the tube 59 is periodically deflected by oscillations, which may be of saw-tooth wave form, generated by the oscillator 60 which is synchronized in operation by the scanning-control signal of the generator 21 applied thereto through the delay network 61. The cathode-ray beam of tube 59 thus scans in synchronism with the radiated-signal beam of the array 10a. It is the purpose of the delay network 61 so to control the scanning action that the cathode-ray beam of tube 59 initiates a scanning cycle at a moment when the radiated-signal beam of the array 10a extends in the direction of alignment of the translators of the array. One entire trace of the cathode-ray beam thus corresponds to a scanning angle of substantially 180 degrees of the radiated-signal beam and the center of the trace corresponds to the position of the radiated-signal beam normal to the direction of alignment of the translators of the array 10a where the configuration of the beam is sharpest.

As the radiated-signal beam of the array 10a and the directive-response characteristic of the array 10b scan the predetermined space in synchronism, a pulse or burst of radiated-signal energy is reflected by the reflector each time the radiated-signal beam scans across it. This burst or pulse of radiated-signal energy, after it is received by the array 10b and suitably modulated by the modulators 45–49, inclusive, amplified by the amplifiers 51–55, inclusive, and the amplifier 56, and detected by the detector 57, produces a unidirectional potential of periodic pulse wave form of which each pulse thereof corresponds to a pulse or burst of received radiated-signal energy. This derived periodic potential is amplified by the amplifier 58 and applied to the input electrodes of the cathode-ray tube 59 to modulate the cathode-ray beam thereof, whereby there is produced on the screen of this tube a spot, the position of which on the trace of tube 59 is indicative of the direction of the radiated-signal reflector from the locating system.

Since a discrete interval of time is required for the energy of the radiated-signal beam of the array 10a to travel to the radiated-signal reflector and to be reflected therefrom to the receiving array 10b, a rapid rate of scanning by the arrays of the translator system 10 and the desirability of locating distant reflectors renders advisable the use of the adjustable phase shifter 37. The latter has the effect of introducing a phase delay between the modulation signals applied to the modulators 45–49, inclusive, and the wave signals applied to the translators of the array 10a, whereby the directive-response characteristic of the array 10b scans in synchronism with the radiated-signal beam of the array 10a, as mentioned, but angularly lags the latter by a selectable value established by adjustment of the phase shifter 37. It may be noted in this regard that adjustments of the phase shifter 37 do not change the position along the trace on tube 59 of any spot produced by received wave energy, since its position is determined solely by the direction from which the received wave energy arrives at the translator array 10b and the distance of the radiated-signal reflector from the translator arrays 10a and 10b, but rather change the intensity of the spot by causing the array 10b to have maximum response in the direction of arrival of the received wave energy at the moment of arrival thereof. The reasons for this will now be explained with reference to Figs. 1A and 1B. Curve K of Fig. 1A represents the directional radiation characteristic of the translator array 10a at a selected moment after it has scanned through an angle α from the axes X—X of alignment of the translators 11–15, inclusive, of the array 10a. Assume that the radiated-signal beam has maximum intensity in the direction of a radiated-signal reflector P at this selected moment. Assume further as an initial condition that the reflector P is sufficiently close to the translator systems 10a and 10b that the wave-signal propagation interval required for the radiated energy of the beam to travel from the translator system 10a to the reflector P and back to the translator system 10b is negligible. Lastly, assume that the adjustable phase shifter 37 is adjusted to provide zero phase shift therethrough so that curve K also represents the directive characteristic of the receiving array 10b. The radiated-signal energy received by reflection from the reflector P is translated through the receiving system in the manner previously described to produce a spot Y, Fig. 1B, on the trace of tube 59. As earlier explained, the trace of tube 59 is initiated at the moment when the radiated-signal beam of the array 10a is in the direction of alignment of the translators 11–15, inclusive, or, expressed in another manner, when the angle α has zero value. Further, it was previously explained that the cathode-ray beam of tube 59 scans in synchronism with the scanning of the radiated-signal beam of the array 10a so that the entire trace of tube 59 represents a 180-degree scanning angle of the radiated-signal beam and may be so labeled as indicated in Fig. 1B. The spot Y thus produced on the trace by the received reflected energy directly provides an indication of the angle α which the direction of the radiated-signal reflector P forms with the alignment axes X—X of the arrays 10a and 10b.

Assume now that the direction of the radiated-signal reflector P is the same as that first assumed but that the distance of the reflector P from the arrays 10a and 10b is much greater so that the wave-signal propagation interval now becomes so large that the radiated-signal beam of the array 10a scan through an additional angle Δα, as indicated by the broken-line curve L of Fig. 1A, before the reflected radiated-signal energy propagates back to the receiving array 10b. If the adjustable phase shifter 37 has the phase shift first assumed, curve L of Fig. 1A also represents the directional response characteristic of the receiving array 10b and it will be apparent that the latter has substantially reduced response for the reflected radiated-signal energy. The position of the spot which the reflected-signal energy would produce on the trace 59 if properly received is indicated in Fig. 1B by the broken-line spot Y'. The spot Y' will not be produced, of course, until the adjustable phase shifter 37 is adjusted to provide sufficient delay that the receiving array 10b has maximum response in the direction of the reflector P, as represented by curve K of Fig. 1A, under the assumed conditions. When this occurs, the directive-response characteristic of the receiving array 10b lags that of the array 10a by the angle Δα and, the receiving array then having maximum response in the direction of the reflector P at a moment of reception of reflected radiated-signal energy therefrom, the spot Y' is produced on the trace of tube 59. It will be apparent, however, that the position of the spot Y' on the trace now is determined both by the scanning angle α and by the distance of the reflector P from the translator systems 10a and 10b. Since the scanning by these arrays varies sinusoidally with time, the angle Δα provides a measure of the distance of the reflector P from the arrays 10a and 10b, as indicated by the distance legend d of Fig. 1B. Consequently, the control knob of the adjustable phase shifter is calibrated in terms of distance, thus directly to provide an indication of the distance of the radiated-signal reflector P from the arrays, and is also calibrated in terms of the angle of phase delay so that for any adjustment of the phase shifter 37 the angle α of the reflector P may be obtained from its indicated position on the trace of tube 59 by subtracting from the indicated position on the trace the phase shift in degrees provided by the phase shifter 37.

It will now be apparent that the response of of the system to radiated-signal reflectors is in the nature of response bands, the minimum and maximum distance limits of any such response band varying with the scanning velocity, the adjustment of the phase shifter 37, and with the width of the scanning lobe of the receiving array 10b. In some applications, it may be desirable continuously and periodically to drive the phase shifter 37 over a predetermined range of its adjustment so that within each of successive groups of scanning cycles indications of both nearby and distant reflectors are provided.

It has heretofore been stated that predetermined ones of the modulation components developed in the output circuits of the modulators 45–49, inclusive, have additive phase only for one direction of reception by the array 10b. The question regarding which modulation components should be selected by the selectors of units 51–55, inclusive, to effect synchronous scanning of the arrays 10a and 10b will now be considered with reference to Fig. 1C and a mathematical analysis of the scanning action of these arrays. Consider only the three centrally positioned translators 12, 13 and 14 of the array 10a, as indicated in Fig. 1C, and assume that the wave signals applied to these translators are given by the respective relations:

$$e_{12}=E \cos (\omega_1+\omega_h) t \quad (1)$$
$$e_{13}=E \cos \omega_1 t \quad (2)$$
$$e_{14}=E \cos (\omega_1-\omega_h) t \quad (3)$$

where $$\omega_1 = 2\pi(f_o+f_c)$$
$$\omega_h = 2\pi f_h$$

E=the maximum amplitude of the wave signals applied to the translators 12, 13 and 14.

As shown in the aforementioned Lewis application, Serial No. 507,859, the wave-signal energy received by a distant radiated-signal reflector in a direction α from the axis of alignment of the translators 12, 13 and 14 is:

$$e_s = E'[1+2 \cos (\omega_h t + 2\pi a \cos a)] \cos \omega_1 t \quad (4)$$

where $$a = \frac{d}{\lambda}$$

d=the spacings, assumed equal, of the translators within each array expressed in arbitrary unit,
λ=the wave length of the wave signal applied to the translator 13 expressed in the same unit as d,
E'=kE, and
k=the attenuation factor of the received wave signals due to their space propagation.

A method of graphically solving Equation 4 is described and illustrated in the aforementioned Lewis application, Serial No. 507,859, and it is there shown that the radiated-signal beam of the array 10a scans a predetermined space at an angular frequency $\omega_h$, the direction of scanning progressing from the translator having the highest-frequency mave signal applied thereto toward the translator having the lowest-frequency applied wave signal. Under the conditions above assumed, the direction of scanning by the radiated-signal beam is from the translator 12 toward the translator 14, or from right to left in Fig. 1C.

Scanning systems of this nature may be said to have a radiated-signal beam or major lobe of radiation for the reason that during a particular short interval of each scanning cycle the radiated wave signals of the translators all add in phase at a given distant point fixed in space, but have such differing phases during the remaining portions of the scanning cycle that the resultant radiated-signal energy received at the given point is substantially zero. At the moment when the radiated-signal beam of the array $10_a$ thus scans across the remotely situated radiated-signal reflector, the phase coefficient of Equation 4 equates to zero; that is, the sum of $\omega_h t$ and $2\pi a \cos \alpha$ must either equal zero or $2\pi n$ where $n$ is any integer. The radiated-signal energy of all of the translators of the array $10_a$ is then in additive phase and the radiated-signal energy of the beam reflected by the reflector has the angular frequency $\omega_1$.

Now assume that the receiver translator array $10_b$ is positioned relatively closely to the transmitter array $10_a$ so that the reflector is also remotely situated from the former. The reflected radiated-signal energy arrives at the array $10_b$ from a direction forming the same angle $\alpha$ with the direction of alignment of its translators 17, 18 and 19. Hence, the wave-signal energy received by the translators of the array $10_b$ may be expressed by the respective relations:

$$e_{17} = E'' \cos(\omega_1 t + 2\pi a \cos \alpha) \quad (5)$$
$$e_{18} = E'' \cos \omega_1 t \quad (6)$$
$$e_{19} = E'' \cos(\omega_1 t - 2\pi a \cos \alpha) \quad (7)$$

where $E'' = k'E'$
$k'$ = the combined coefficient of radiant-energy reflection of the radiated-signal reflector and attenuation factor due to space propagation.

Equations 5, 6 and 7 are based on the assumption that the time required for wave-signal energy to travel from the array $10_a$ to the reflector and back to the array $10_b$ is negligible. In practice, any variations from this assumption are compensated by the adjustable phase shifter 37 which adds an electrical phase shift corresponding to the phase shift existing between the radiated and received wave signals due to the time of transit of the latter through space.

Assume now that there are applied to the modulators 46, 47 and 48, associated with the respective translators 17, 18 and 19, modulation signals given by the respective relations:

$$e_{o-46} = E_o \cos(\omega_o - \omega_h)t \quad (8)$$
$$e_{o-47} = E_o \cos \omega_o t \quad (9)$$
$$e_{o-48} = E_o \cos(\omega_o + \omega_h)t \quad (10)$$

where $E_o$ = the amplitude of the modulation signals applied to the modulators 46, 47 and 48, and
$\omega_o = 2\pi(f_o - f_c)$.

Assume further that the difference-frequency modulation components developed in the output circuits of the modulators 46, 47 and 48 are selected by the intermediate-frequency selectors of the respective units 52, 53 and 54 and combined in the common input circuit of the intermediate-frequency amplifier 56. It can be shown that the combined difference-frequency components produce an intermediate-frequency wave signal expressed by the relation:

$$e_{ij} = [1 + 2\cos(\omega_h t + 2\pi a \cos \alpha)] \cos(\omega_1 - \omega_o)t \quad (11)$$

Equation 11 can be graphically solved in the manner described and illustrated in the aforementioned Lewis application, Serial No. 507,859. When this is done, it is found that the directive-response characteristic of the array $10_b$ scans in the direction from that translator which is associated with the modulator having the lowest-frequency applied modulation signal toward the translator which is associated with the modulator having the highest-frequency applied modulation signal or, under the conditions assumed, from the translator 17 toward the translator 19. This direction of scanning is the same as that of the array $10_a$ and, hence, the two arrays have directive characteristics which scan a predetermined space in synchronism.

While only three translators of the arrays $10_a$ and $10_b$ have been considered in the preceding analysis, it can readily be shown by similar analysis that the same result is obtained when all of the translators of the array are considered.

Under the conditions above assumed, it can readily be shown that if the sum-frequency modulation components were selected by the selectors of units 52, 53 and 54 this would have the effect that the directive-response characteristic of the array $10_b$ scans in the opposite direction to that of the array $10_a$. It will thus be evident that where a higher-frequency modulation signal is applied to the modulator 46 and a lower-frequency modulation signal to the modulator 48, the sum-frequency modulation components must be selected by the selectors of units 52, 53 and 54 to cause the directive-response characteristic of the array $10_b$ to scan in synchronism and in the same sense with the array $10_a$. Selection of the difference-frequency modulation components would, in such case, cause the directive-response characteristic of the array $10_b$ to scan in a direction opposite to that of the array $10_a$. It is usually preferable that the amplifiers of the units 51–55, inclusive, be relatively low-frequency amplifiers for reasons well known to one skilled in the art and, hence, that the frequencies of the modulation signals applied to the modulators 45–49, inclusive, be such that the difference-frequency modulation components may be selected and utilized since these components have a frequency much lower than that of the wave signals radiated by the array $10_a$.

While the heterodyne oscillator 44 of the receiving system is indicated as having a frequency equal to that of the heterodyne oscillator 30 of the transmitting system, this is done for purposes of simplicity only and it will be understood that the only requirement regarding the oscillator 44 is that the wave signal generated thereby should have the proper frequency to produce intermediate-frequency wave signals of the frequency to which the amplifiers of units 51–55, inclusive, and 56 are tuned. Additionally, while the translator system 10 is shown as including separate transmitter and receiver arrays $10_a$ and $10_b$, respectively, it will be apparent to one skilled in the art that the translators of the array $10_a$ may be utilized both as radiating and receiving translators, it being only necessary to provide, for example, transmission lines of suitable length between the output circuits of the selector-amplifier units 31–35, inclusive, and the translators 11–15, inclusive, on the one hand, and suitable lengths of transmission lines between the last-mentioned translators and the input circuits of the receiver modulators. In this event, the transmitter system is operated with pulse modulation, as described in the aforementioned application, Serial No. 507,859.

From the above description of the Fig. 1 arrangement, it will be seen that the generators 21 and 22, the balanced modulator 23, and the selector-modulator unit 24 comprise means responsive to the signals of the generator 21 for deriving a plurality of wave signals having individual frequencies spaced in the frequency spectrum in proportion to the physical spacings of individual predetermined ones of the translators of the translating system 10, these wave signals being equally spaced in the frequency spectrum where the translators 11–15, inclusive, of the translating system are equally spaced in the array 10a. Similarly, it will be seen that the generators 21 and 22, the balanced modulator 36, the selector-modulator unit 38, and the modulators 45–49, inclusive, comprise means responsive to the signals of the generator 21 for modulating the reflected radiated-signal energy individually received by individual predetermined ones of the translators of the translating system 10 with individual modulation signals having individual frequencies different from the wave signals applied to the translators of the array 10a and spaced in the frequency spectrum in proportion to the physical spacing of the individual translators of the array 10b to cause predetermined ones of the resulting modulation components to have additive phase only for one direction of reception by the translators of the array 10b, which direction scans a predetermined space in synchronism with the radiated-signal beam of the array 10a. In this connection, it may be noted that the modulation signals are equally spaced in the frequency spectrum where the translators of the array 10b have equal physical spacings.

From the foregoing description of the Fig. 1 system, and particularly from Equations 4 and 11 thereof, it will be apparent that the period of scanning of the system's directivity characteristic varies with the fundamental and harmonic frequencies $\omega_h$ and $2\omega_h$ of the signal generated by the scanning-control signal generator 21. Thus, the period of scanning may easily and readily be varied simply by variation of the frequencies of this generator. Any such adjustments may, of course, require slight corresponding readjustments of the tuning of the band-pass selectors of the transmitter units 25–29, inclusive, and of the receiver units 39–43, inclusive, which may be accomplished if desired by suitable unicontrol tuning means. The configuration of the transmitter scanning beam or major lobe, and particularly the ratio of the amplitudes of the major to minor lobes, varies with the relative amplitudes of the wave signals translated by the transmitter units 31–35, inclusive, and hence may be controlled by relative adjustments of the gains of the amplifiers included in the latter units. In similar manner, the configuration of the major and minor lobes of the receiver varies with the relative amplitudes of the modulating signals applied to the receiver modulators 45–49, inclusive, and may be controlled by relative adjustments of the amplitudes of the signals supplied by the receiver units 39–43, inclusive.

In some applications, it may be desirable to provide a system of the type described in which scanning of a predetermined space is effected in two directions normal to each other. It will be apparent that this may readily be done by the provision of a second system of the type shown in Fig. 1 and hereinbefore described but with the radiated-signal translators of the former positioned and aligned normal to the translators of the latter system. In this case it is preferable that the additional or second system scan at a different rate than the first in order that its output signal may be applied to deflecting electrodes additionally provided in the cathode-ray indicating tube normal to those to which the first system is coupled. The resulting scanning pattern is then essentially a raster of parallel scanning lines and received reflected energy of the scanning beam produces on the screen of the indicating tube intersecting lines normal to each other, the intersection of the lines providing an indication in two dimensions of the position of the reflector.

Fig. 2 schematically represents a complete radiated-signal locating system which is essentially similar to that of Fig. 1, similar elements being designated by similar reference numerals and analogous elements by similar reference numerals primed. The system of Fig. 2 differs from that of Fig. 1 in that the translator arrays 10′a and 10′b of the translator system 10′ each include an even number of radiated-signal translators. These translators may, for example, be vertical dipole antennas horizontally aligned and preferably equally spaced in each array. There is the additional difference in the present arrangement that the modulation signals for the modulators of the receiving system are obtained from the output circuits of the transmitter selector-modulator unit 24′.

Considering first the use of an even number of translators in each array, as distinguished from the odd number of translators used in the array of the Fig. 1 arrangement, it will be seen that neither array of the Fig. 2 translator system 10′ has a translator which is centrally positioned with relation to all of the translators of the array. However, there is a point in each array which can be considered the central point of the array and the scanning-control signal of the generator 21′ has frequency components, the values of which are indicated in Fig. 2, related to the spacings of the translators from such central point of the array. The balanced modulator 23′ is of the so-called "suppressed carrier" type wherein the wave signal of the generator 22 is suppressed in the output circuit of the modulator 23′. The use of an additional translator 65 in the transmitter array 10′a requires, of course, an additional selector-modulator unit 63 and selector-amplifier unit 64 for deriving the wave signal which is applied to the radiated-signal translator 65.

In regard to the arrangement utilized in Fig. 2 for supplying modulation signals to the modulators of the receiving system, the sum-frequency heterodyne components developed in the output circuit of the selector-modulators of unit 24′ are selected and applied to the following selector-amplifier units 31′–35′, inclusive, and 64, as in the Fig. 1 arrangement. The difference-frequency heterodyne components developed in the output circuits of the selector-modulators of unit 24′ have the correct values of frequency to be used as modulation signals for the modulators 45′–49′, inclusive, and a modulator 67 required for a sixth radiated-signal translator 66 used in the receiver array 10′b. To effect synchronous scanning of the directional-radiation characteristics of the arrays 10′a and 10′b, the sum-frequency heterodyne components are applied to the radiated-signal translators of the array 10′a in the order which the translators have in this array and the difference-frequency modulation components are applied to the modulators 45–49, inclusive, and 67 in the order in which their associated translators occupy in the array 10′b in corresponding relation to the translators of the array 10′a, as shown in the drawings. This method of obtaining the modulation signals for the receiving system has the advantage that it appreciably simplifies the locator system since it dispenses with the phase shifter 37, the balanced modulator 36, and the selector-modulator unit 38 required in the Fig. 1 arrangement. There is a limitation, however, that high rates of scanning may not be possible in certain applications since the present arrangement has no means for angularly displacing the directive-response characteristic of the array 10′b from that of the array 10′a to compensate for the time required for radiated-signal energy to travel from the array 10′a to the radiated-signal reflector and back to the array 10′b.

An additional intermediate-frequency selector and amplifier unit 68 is provided to couple the output circuit of the modulator unit 67 to the common input circuit of the intermediate-frequency amplifier 56.

The operation of the Fig. 2 locating system is essentially similar to that of Fig. 1 except for the frequencies of the derived wave signals, the translated wave signals, and the modulation signals applied to the modulators of the receiving system, these several signals having the individual frequencies designated in Fig. 2. In this regard, it will be noted that the scanning-control signals of the generator 21′ have frequency components proportional to the spacing of the translators of the array 10′a and 10′b from a point in each array common to all of the translators thereof, which for the frequencies indicated in Fig. 2 is the point at the center of each array. The reason for this choice of frequency components is considered in greater detail in copending applications, Serial Nos. 507,859 and 507,860, previously mentioned. The frequency designations of Fig. 2 are suitable for a system in which the translators of the arrays 10′a and 10′b have equal spacings within each array and this spacing in the array 10′b is the same as that in the array 10′a. Aside from the wave-signal and modulation-signal frequencies, the operation of the Fig. 2 locating system is otherwise the same as that of Fig. 1 and the described operation will therefore not be repeated.

Fig. 3 schematically represents a portion of a locating system essentially similar to that of Fig. 1, similar elements being designated by similar reference numerals and analogous elements by similar reference numerals double primed, except that the Fig. 1 translator 18, its associated modulator 47 and amplifier 53, and the selector-modulator 41 of the unit 38 have been omitted in the Fig. 3 arrangement, as indicated by the broken lines. The array 10a of the present arrangement thus has five translators, whereas the array 10″b has only four translators with the translators 17 and 19 thereof spaced by twice the spacing of the pairs of translators 16 and 17 or 19 and 20. Additionally, and for a reason presently to be explained, amplifier of unit 33 in the present arrangement preferably has a gain 2.25 times that of the amplifiers in the units 31, 32, 34 and 35.

The operation of the Fig. 3 locating system is essentially similar to that of Fig. 1, differing only therefrom in that minor or spurious radiation lobes characteristic of the array 10a intervene between minor or undesired lobes of the directional-response characteristic of the array 10″b. The excitation of the translator 13 of the array 10a by wave signals having an amplitude 2.25 times that of the wave signals applied to the other translators of this array has the effect of eliminating two undesired minor or spurious lobes of radiation which are present in the directional-radiation characteristic of the array 10a of the Fig. 1 arrangement where the translators are all excited by wave signals of equal amplitudes. The equation expressing the directional-radiation characteristic of the array 10a when excited in the manner described, and corresponding to Equation 4 above used in connection with the array 10a of the Fig. 1 arrangement, is given by the relation:

$$e_s = E[2.25 + 2\cos(\omega_h t + 2\pi a \cos\alpha) + 2\cos 2(\omega_h t + 2\pi a \cos\alpha)]\cos\omega_1 t \quad (12)$$

The directional-radiation characteristic of the array 10a of the Fig. 3 arrangement is shown by the solid-line curves A, B and C of Fig. 4 at three selected intervals during a scanning cycle; namely, at intervals $\omega_h t$ equal to $\pi$, $3\pi/2$, and $2\pi$. Curves A, B and C were obtained by graphical solution of Equation 12 in the manner described and illustrated in the aforementioned application, Serial No. 507,859.

The intermediate-frequency wave signal developed in the common output circuit of the selector-amplifier units 51, 52, 54 and 55 of the receiving system can be shown, by an analysis similar to that employed above in connection with the receiving system of the Fig. 1 arrangement, to be one expressed by the relation:

$$e_{ij} = [2\cos(\omega_h t + 2\pi a \cos\alpha) + 2\cos 2(\omega_h t + 2\pi a \cos\alpha)]\cos(\omega_1 - \omega_0)t \quad (13)$$

Equation 13 can be graphically solved, in the manner of the graphical solution of Equation 12, to obtain the directional-response characteristic of the receiver array 10″b of the Fig. 3 arrangement. The broken-line curves D, E and F of Fig. 4 were obtained in this fashion and represent this characteristic at selected intervals during a scanning cycle corresponding to values of $\omega_h t$ equal to $\pi$, $3\pi/2$, and $2\pi$, respectively.

It will be apparent from inspection of curves A–F, inclusive, that when a minor or spurious lobe of radiation of the array 10a causes an undesired reflection from a radiated-signal reflector, the corresponding receiver-system directional-response characteristic is substantially zero. Thus, the Fig. 3 locating system has the important advantage that indications are provided of only those radiated-signal reflectors which reflect radiated-signal energy of the major radiation lobe or scanning beam of the array 10a. The operation of the Fig. 3 arrangement is otherwise essentially similar to that of Fig. 1 and the described operation will therefore not be repeated.

The aforementioned copending applications, Serial Nos. 507,859 and 507,860 disclose respective transmitting and receiving systems having directivity characteristics which scan a predetermined space in two dimensions normal to each other. From the above description of the present invention, it will be apparent that a locating system capable of scanning space in two directions may be readily effected by utilizing two-directional scanning transmitters and receivers of the types disclosed in the aforementioned copending applications. This type of locating system has numerous advantages which will be apparent to one skilled in the art.

The pulse-modulation types of operation described in the aforementioned copending application, Serial No. 507,859, are equally applicable to the locating system of the present invention. The receiver of the present system in such case may be either operated with constant sensitivity or the pulse-modulation potentials, for example, may be applied to a gain control circuit of the receiver, as to such circuit of the amplifier 58, suitably to control its sensitivity in a periodic manner.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A system for locating a radiated-signal reflector comprising, a radiated-signal translating system including a plurality of spaced signal translators, wave-signal supply means for applying wave signals to at least one of said translators and wave signals of a different frequency to another of said translators to provide a radiated-signal translating system which angularly scans a predetermined space with a radiated-signal beam, whereby said beam scans across any radiated-signal reflector in said space and radiated-signal energy of said beam is reflected therefrom, modulator means for modulating the reflected radiated-signal energy received by one of said translators with a modulation signal having a predetermined frequency different from the wave signal applied to said first-mentioned one translator and for modulating the reflected radiated-signal energy received by another of said translators with a modulation signal having with respect to the wave signal applied to said first-mentioned other translator a predetermined frequency difference such that predetermined ones of the resulting modulation components have additive phase only for one direction of reception by said translators which direction scans said predetermined space in synchronism with said radiated-signal beam, and means for combining and utilizing said predetermined modulation components to indicate the direction of said reflector from said system.

2. A system for locating a radiated-signal reflector comprising, a radiated-signal translating system including a plurality of spaced signal translators, wave-signal supply means for applying wave signals to at least one of said translators and wave signals of a different frequency to another of said translators to provide a radiated-signal translating system which angularly scans a predetermined space with a radiated-signal beam, whereby said beam scans across any radiated-signal reflector in said space and radiated-signal energy of said beam is reflected therefrom, modulator means for modulating the reflected radiated-signal energy received by one of said translators with a modulation signal having a predetermined frequency difference from the wave signal applied to said first-mentioned one translator and for modulating the reflected radiated-signal energy received by another of said translators with a modulation signal having with respect to the wave signal applied to said first-mentioned other translator a frequency difference not less than said predetermined frequency difference, whereby predetermined ones of the resulting modulation components have additive phase only for one direction of reception by said translators which direction scans said predetermined space in synchronism with said radiated-signal beam, and means for combining and utilizing said predetermined modulation components to indicate the direction of said reflector from said system.

3. A system for locating a radiated-signal reflector comprising, a radiated-signal translating system including a plurality of spaced signal translators, wave-signal supply means for applying wave signals to at least one of said translators and wave signals of a different frequency to another of said translators to provide a radiated-signal translating system which angularly scans a predetermined space with a radiated-signal beam, whereby said beam scans across any radiated-signal reflector in said space and radiated-signal energy of said beam is reflected therefrom, modulator means for modulating the reflected radiated-signal energy received by one of said translators with a modulation signal having a predetermined frequency difference from the wave signal applied to said first-mentioned one translator and for modulating the reflected radiated-signal energy received by another of said translators with a modulation signal having with respect to the wave signal applied to said first-mentioned other translator a frequency difference which is greater than said predetermined frequency difference by twice the frequency difference between said applied wave signals, whereby predetermined ones of the resulting modulation components have additive phase only for one direction of reception by said translators which direction scans said predetermined space in synchronism with said radiated-signal beam, and means for combining and utilizing said predetermined modulation components to indicate the direction of said reflector from said system.

4. A system for locating a radiated-signal reflector comprising, a radiated-signal translating system including a plurality of spaced signal translators, wave-signal supply means for applying wave signals to at least one of said translators and wave signals having an incremental frequency difference therefrom to another of said translators to provide a radiated-signal translating system which angularly scans a predetermined space with a radiated-signal beam, whereby said beam scans across any radiated-signal reflector in said space and radiated-signal energy of said beam is reflected therefrom, modulator means for modulating the reflected radiated-signal energy received by one of said translators with a modulation signal having a predetermined frequency difference from the wave signal applied to said first-mentioned one translator and for modulating the reflected radiated-signal energy received by another of said translators with a modulation signal having with relation to said first-mentioned modulation signal said first-mentioned frequency difference, whereby predetermined ones of the resulting modulation components have additive phase only for one direction of reception by said translators which direction scans said predetermined space in synchronism with said radiated-signal beam, and means for combining and utilizing said predetermined modulation components to indicate the direction of said reflector from said system.

5. A system for locating a radiated-signal reflector comprising, a radiated-signal translating system including a plurality of spaced signal translators, a source of scanning-control signals having frequency components related to the spacing of said signal translators, means responsive to the signals of said source for deriving a plurality of wave signals of individual different frequencies and for applying said derived wave signals individually to translators of said translating system to cause said translators angularly to scan a predetermined space with a radiated-signal beam, whereby said beam scans across any radiated-signal reflector in said space and radiated-signal energy of said beam is reflected therefrom, means responsive to the signals of said source for modulating the reflected radiated-signal energy individually received by translators of said translating system with individual modulation signals having individual different frequencies related to the frequencies of the wave signals applied to said first-mentioned translators to cause predetermined ones of the resulting modulation components to have additive phase only for one direction of reception by said last-named translators which direction scans said predetermined space in synchronism with said radiated-signal beam, and means for combining and utilizing said predetermined modulation components to indicate the direction of said reflector from said system.

6. A system for locating a radiated-signal reflector comprising, a radiated-signal translating system including a plurality of spaced signal translators, a source of scanning-control signals having frequency components proportional to the spacing of said translators from at least one common reference point, means responsive to the signals of said source for deriving a plurality of wave signals of individual different frequencies and for applying said derived wave signals individually to translators of said translating system to cause said translators angularly to scan a predetermined space with a radiated-signal beam, whereby said beam scans across any radiated-signal reflector in said space and radiated-signal energy of said beam is reflected therefrom, means responsive to the signals of said source for modulating the reflected radiated-signal energy individually received by translators of said translating system with individual modulation signals having individual different frequencies related to the frequencies of the wave signals applied to said first-mentioned translators to cause predetermined ones of the resulting modulation components to have additive phase only for one direction of reception by said last-named translators which direction scans said predetermined space in synchronism with said radiated-signal beam, and means for combining and utilizing said predetermined modulation components to indicate the direction of said reflector from said system.

7. A system for locating a radiated-signal reflector comprising, a radiated-signal translating system including a plurality of spaced signal translators, a source of scanning-control signals having frequency components related to the spacing of said signal translators, means responsive to the signals of said source for deriving a plurality of wave signals of individual different frequencies and for applying said derived wave signals individually to translators of said translating system to cause said translators angularly to scan a predetermined space with a radiated-signal beam, whereby said beam scans across any radiated-signal reflector in said space and radiated-signal energy of said beam is reflected therefrom, adjustable phase-control means coupled to said source for translating scanning-control signals having selectable values of phase relative to the signals of said source, means responsive to scanning-control signals translated by said phase-control means for modulating the reflected radiated-signal energy individually received by translators of said translating system with individual modulation signals having individual different frequencies related to the frequencies of the wave signals applied to said first-mentioned translators to cause predetermined ones of the resulting modulation components to have additive phase only for one direction of reception by said last-named translators which direction scans said predetermined space in synchronism with said radiated-signal beam but angularly displaced therefrom by a selectable value established by adjustment of said phase-control means, and means for combining and utilizing said predetermined modulation components to indicate the direction of said reflector from said system.

8. A system for locating a radiated-signal reflector comprising, a radiated-signal translating system including a plurality of spaced signal translators, a source of scanning-control signals having frequency components related to the spacing of said signal translators, means responsive to the signals of said source for deriving a plurality of wave signals of individual different frequencies, means for heterodyning said wave signals to higher frequencies and for selecting and applying the sum-frequency heterodyne components individually to translators of said translating system to cause said translators angularly to scan a predetermined space with a radiated-signal beam, whereby said beam scans across any radiated-signal reflector in said space and radiated-signal energy of said beam is reflected therefrom, means for selecting the difference-frequency heterodyne components and for modulating the reflected radiated-signal energy individually received by translators of said translating system with individual ones of said last-named components to cause predetermined ones of the resulting modulation components to have additive phase only for one direction of reception by said last-named translators which direction scans said predetermined space in synchronism with said radiated-signal beam, and means for combining and utilizing said predetermined modulation components to indicate the direction of said reflector from said system.

9. A system for locating a radiated-signal reflector comprising, a radiated-signal translating system including a plurality of spaced signal translators, a source of scanning-control signals having frequency components related to the spacing of said signal translators, means responsive to the signals of said source for deriving a plurality of wave signals having individual frequencies spaced in the frequency spectrum in proportion to the physical spacing of individual predetermined ones of said translators and for applying said derived wave signals individually to said individual predetermined translators to cause said last-named translators angularly to scan a predetermined space with a radiated-signal beam, whereby said beam scans across any radiated-signal reflector in said space and radiated-signal energy of said beam is reflected therefrom, means responsive to the signals of said source for modulating the reflected radiated-signal energy individually received by individual predetermined ones of said translators with individual modulation signals having individual frequencies different from said derived wave signals and spaced in the frequency spectrum in proportion to the physical spacing of said last-named individual predetermined translators to cause predetermined ones of the resulting modulation components to have additive phase only for one direction of reception by said last-named translators which direction scans said predetermined space in synchronism with said radiated-signal beam, and means for combining and utilizing said predetermined modulation components to indicate the direction of said reflector from said system.

10. A system for locating a radiated-signal reflector comprising, a radiated-signal translating system including a plurality of equally spaced signal translators, a source of scanning-control signals having frequency components related to the spacing of said signal translators, means responsive to the signals of said source for deriving a plurality of wave signals having individual frequencies equally spaced in the frequency spectrum and for applying said derived wave signals individually to translators of said translating system to cause said translators angularly to scan a predetermined space with a radiated-signal beam, whereby said beam scans across any radiated-signal reflector in said space and radiated-signal energy of said beam is reflected therefrom, means responsive to the signals of said source for modulating the reflected radiated-signal energy individually received by translators of said translating system with individual modulation signals having individual frequencies different from said derived wave signals and equally spaced in the frequency spectrum to cause predetermined ones of the resulting modulation components to have additive phase only for one direction of reception by said last-named translators which direction scans said predetermined space in synchronism with said radiated-signal beam, and means for combining and utilizing said predetermined modulation components to indicate the direction of said reflector from said system.

11. A system for locating a radiated-signal reflector comprising, a radiated-signal translating system including a plurality of spaced signal translators grouped into at least two translator arrays, a source of scanning-control signals having frequency components related to the spacing of said signal translators, means responsive to the signals of said source for deriving a plurality of wave signals of individual different frequencies and for applying said derived wave signals individually to the translators of one of said arrays to cause said one array angularly to scan a predetermined space with a radiated-signal beam, whereby said beam scans across any radiated-signal reflector in said space and radiated-signal energy of said beam is reflected therefrom, means responsive to the signals of said source for modulating the reflected radiated-signal energy individually received by the translators of another of said arrays with individual modulation signals having individual different frequencies related to the frequencies of the wave signals applied to said one array to cause predetermined ones of the resulting modulation components to have additive phase only for one direction of reception by said other array which direction scans said predetermined space in synchronism with said radiated-signal beam, and means for combining and utilizing said predetermined modulation components to indicate the direction of said reflector from said system.

12. A system for locating a radiated-signal reflector comprising, a radiated-signal translating system including a plurality of spaced signal translators grouped into at least two translator arrays with the number of translators in one array differing by an odd number from that in another array, a source of scanning-control signals having frequency components proportional to the spacing of the translators in each array from a point common to said each array, means responsive to the signals of said source for deriving a plurality of wave signals having individual frequencies spaced in the frequency spectrum in proportion to the physical spacing of the translators of one of said arrays and for applying said derived wave signals individually to the translators of said one array to cause said one array angularly to scan a predetermined space with a radiated-signal beam, whereby said beam scans across any radiated-signal reflector in said space and radiated-signal energy of said beam is reflected therefrom, means responsive to the signals of said source for modulating the reflected radiated-signal energy individually received by the translators of another of said arrays with individual modulation signals having individual frequencies different from said derived wave signals and spaced in the frequency spectrum in proportion to the physical spacing of the translators of said other array to cause predetermined ones of the resultant modulation components to have additive phase only for one direction of reception by said other array which direction scans said predetermined space in synchronism with said radiated-signal beam, and means for combining and utilizing said predetermined modulation components to indicate the direction of said reflector from said system.

13. A system for locating a radiated-signal reflector comprising, a radiated-signal translating system including a plurality of spaced signal translators, a source of scanning-control signals having frequency components related to the spacing of said signal translators, means responsive to the signals of said source for deriving a plurality of wave signals of individual different frequencies and for applying said derived wave signals individually to translators of said translating system to cause said translators angularly to scan a predetermined space with a radiated-signal beam, whereby said beam scans across any radiated-signal reflector in said space and radiated-signal energy of said beam is reflected therefrom, means responsive to the signals of said source for modulating the reflected radiated-signal energy individually received by translators of said translating system with individual modulation signals having individual different frequencies related to the frequencies of the wave signals applied to said first-mentioned translators to cause predetermined ones of the resulting modulation components to have additive phase only for one direction of reception by said last-named translators which direction scans said predetermined space in synchronism with said radiated-signal beam, a cathode-ray tube, means responsive to said scanning-control signal for deflecting the cathode-ray beam of said tube in synchronism with said scanning beam, and means for combining and utilizing said predetermined modulation components to control the cathode-ray beam of said tube to indicate the direction of said reflector from said system.

HAROLD M. LEWIS.